Jan. 6, 1948.  L. A. BRYANT  2,433,889
MASTER TOOLING DOCK
Filed April 26, 1943  3 Sheets-Sheet 1

LELAND A. BRYANT,
INVENTOR.

BY *[signature]*

ATTORNEY.

Jan. 6, 1948.                L. A. BRYANT                2,433,889
                          MASTER TOOLING DOCK
                  Filed April 26, 1943          3 Sheets-Sheet 2

LELAND A. BRYANT,
INVENTOR.

BY
ATTORNEY.

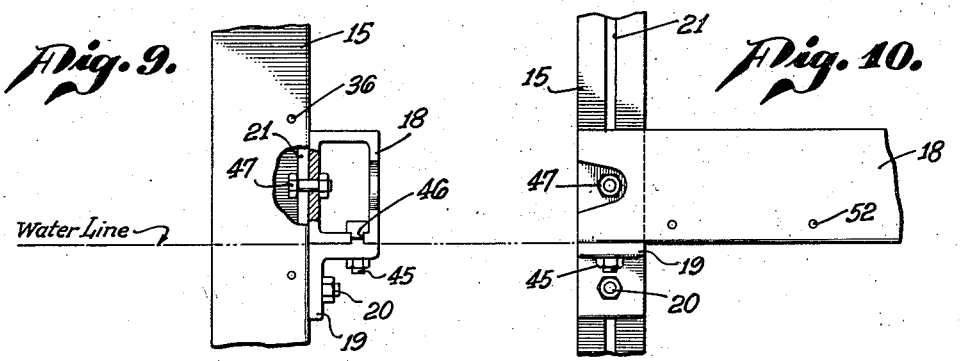
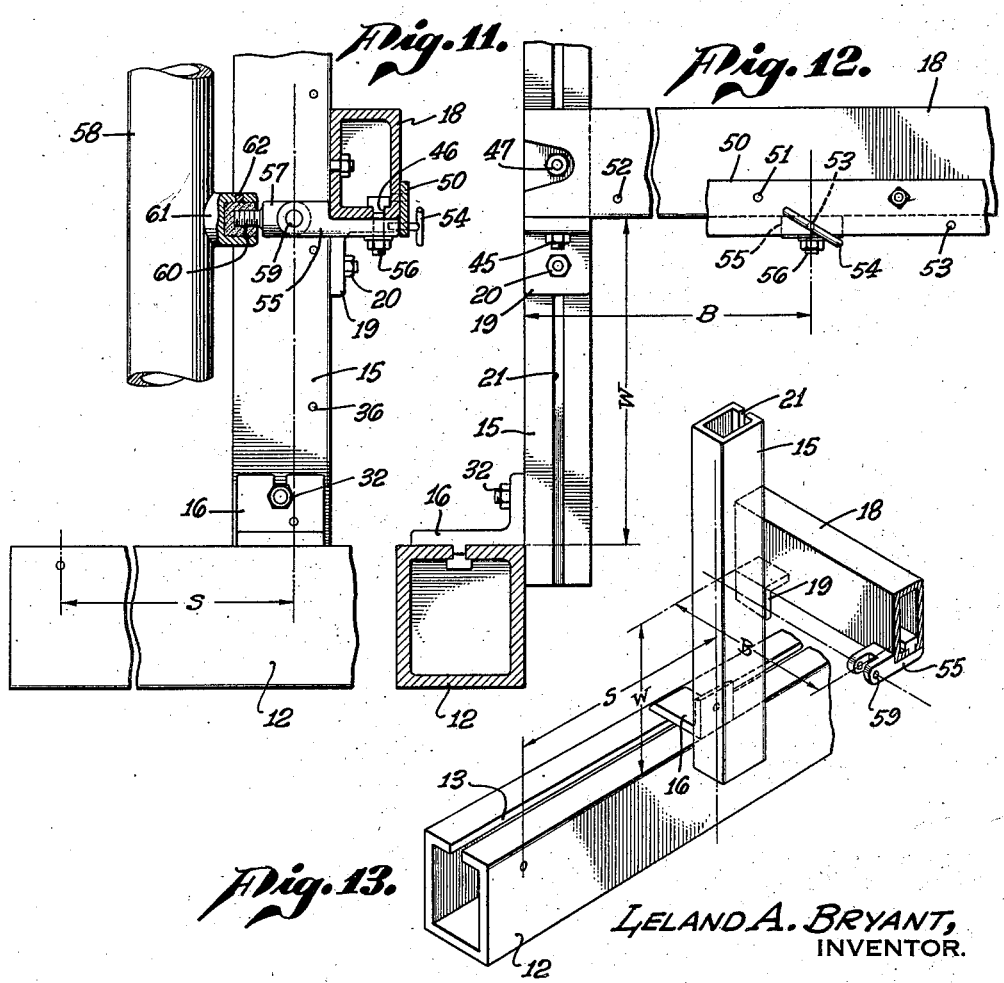

Patented Jan. 6, 1948

2,433,889

UNITED STATES PATENT OFFICE 2,433,889

MASTER TOOLING DOCK

Leland A. Bryant, Beverly Hills, Calif., assignor of one-half to John F. Sullivan, Los Angeles, Calif.

Application April 26, 1943, Serial No. 484,640

7 Claims. (Cl. 33—174)

This invention relates to precision assembly tool making for airplane assembly and the like and more particularly it relates to apparatus by means of which the two dimensional planes and three dimensional points in space as established by loft and engineering design may be precisely fixed in the setting up of the various major, sub-assembly and detail assembly jigs or fixtures.

Heretofore, it has been the practice to translate loft and engineering information upon tool design drawings, and from this translated information to set up the numerous two dimensional planes and three dimensional points in space by means of scale measurements taken with reference to either a basic plane parallel as afforded by a common surface plate, or a horizontal reference line of tightly drawn wire in relation to which other dimensions may be established in the perpendicular with plumb-bobs and in the horizontal with a spirit level or surveyor's transit.

Such painstaking methods are not only slow but place full reliance upon the handicraft of highly skilled jig builders. Moreover, since the planes and points required to be fixed are thus subject to the natural inaccuracies of hand method it becomes necessary to take recourse to the use of so-called "masters" (check gages) which incorporate the inaccuracies of hand method but permit of their duplication in the jig designed to produce mating assemblies, in order that interchangeability may be insured.

One object of my invention is to provide a combination of fixed and movable straight edges by means of which all of the two dimensional planes and three dimensional points in space may be set up directly from loft and engineering information without recourse to surface plates, wires, transits or plumb bobs now in current use.

A further object of my invention is to provide slots in the face of the straight edges for the attachment of fittings that securely assemble the straight edges in any given setting required by the loft or engineering information.

A further object of my invention is to provide strip templates which may be attached to the respective straight edges and which have in their exposed faces margin holes that provide the points of location for attachment of fittings upon the straight edges in exact accordance with the aforesaid loft or engineering information.

It will be obvious to those skilled in the art to which this invention appertains, that the same may be incorporated in several different constructions and may be applied to tool making for other industries than aircraft. The accompanying drawings, therefore, are submitted merely as showing a preferred exemplification of the invention. In the drawings, which are for illustrative purposes only—

Fig. 9 is an elevation of one of the vertical straight edges with a cross straight edge mounted thereon;

Fig. 10 is a face view of the parts shown in Fig. 9;

Fig. 11 is a cross sectional view of one of the cross straight edges and associated parts illustrating the manner of mounting a jig fitting;

Fig. 12 is a face view partly in section of the parts shown in Fig. 11; and

Fig. 13 is a diagrammatic perspective view showing portions of the longitudinal vertical and transverse straight edges illustrating the dimensional relationships of the station, water and butt lines as used in locating a dummy fitting.

Figure 1:
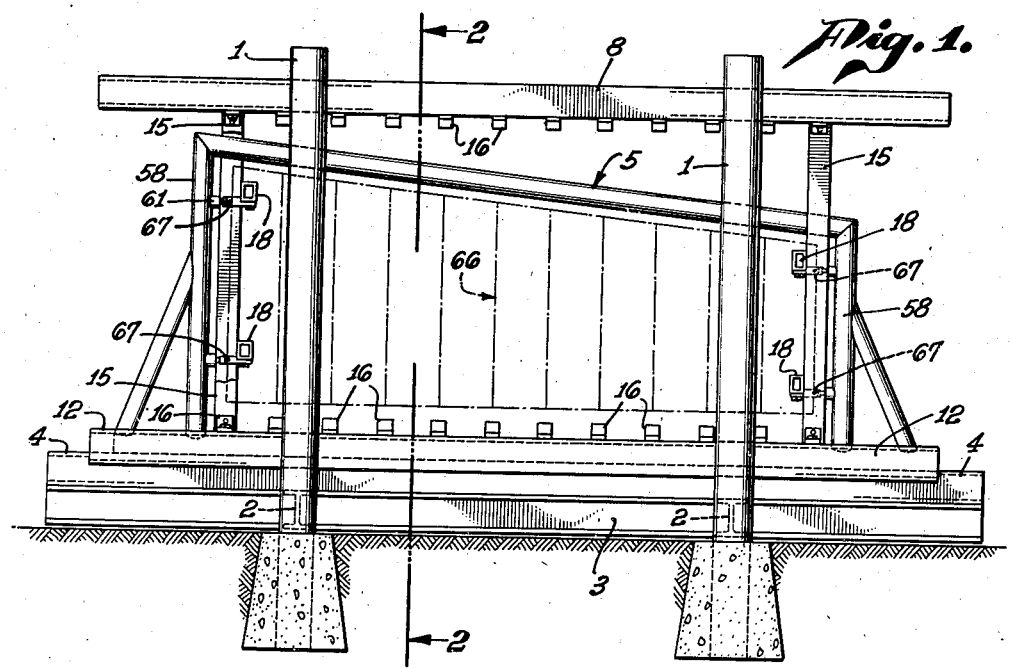
Fig. 1 is a side elevation of a tooling dock embodying a form of my invention.

In the form shown in the drawings the tooling frame consists of four posts 1 arranged in two pairs, the lower ends of the posts being fixed in any appropriate solid foundation. These posts are parallel to each other and each pair of posts is connected by cross beams 2 secured to longitudinally extending beams 3. The foundation, posts and cross beams form a rigid structure. Mounted on the beams 3 are longitudinally extending hollow jig supporting bars 4 having a slot in their upper face to facilitate the mounting thereon of the jig frame indicated at 5 in Fig. 1.

At the upper end of each post 1 is secured a bracket 7 to which is secured by welding or in any other suitable manner, longitudinally extending horizontal upper straight edges 8, each of which is provided in its lower face with a slot 9 for the purpose hereinafter explained. Designated by the numerals 11 are lower brackets each secured as by welding or any other suitable manner to its adjacent post 1 and cross beam 2. These brackets 11 support longitudinally extending horizontal lower straight edges 12 which are secured to the brackets 11 in any suitable manner, such straight edges having slots 13 formed in their upper face for the purposes hereinafter described. While I have shown the straight edges hollow with slots to receive the fastening means for the various fittings it is to be understood that if the straight edges are solid that such solid straight edges would be provided with T-slots. When mounted, as just described, the frame is provided with four longitudinally extending straight edges all parallel to each other.

The upper and lower longitudinally extending straight edges on each side of the frame are arranged to support in selected positions one or more adjustable vertical straight edges 15. Secured to the straight edges 8 and 12 in selected position are brackets 16. This is done by means of T-bolts 17 engageable in the slots 9 and 13 in the straight edges 8 and 12 respectively. The vertical straight edges 15 are secured to the brackets 16 in any suitable manner as by bolts or screws as described hereinafter.

Transverse adjustable straight edges 18 are mounted in selected position on the vertical straight edges 15 by means of fittings or brackets 19 secured to the vertical straight edges 15 by means of T-bolts 20 which engage in the slots 21 in the straight edges 15. The brackets 19 are also used to locate the position of the cross straight edges in selected position on the vertical straight edges 15 as more fully described hereinafter.

Figure 3:
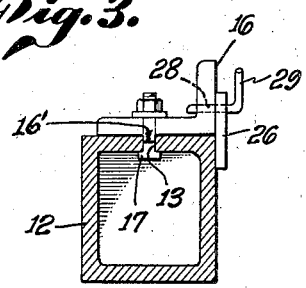
Fig. 3 is an end view of one of the lower straight edges and fitting thereon.
Figure 4:
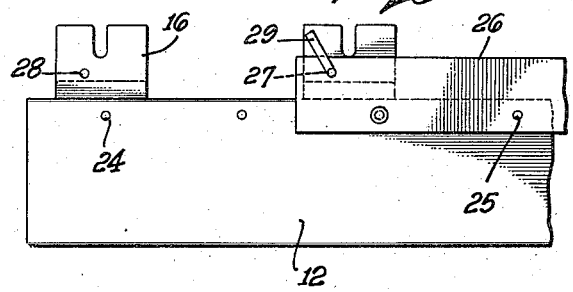
Fig. 4 is a face view of the straight edge and fitting shown in Fig. 3.

It is to be understood that in placing the vertical and the transverse straight edges in proper position that loft and engineering data is required and followed in such operations. For instance, the vertical straight edges are set according to the proper position of the point to be located on the fuselage reference line which is a line extending longitudinally through the ship. This is done as illustrated in Figs. 3 and 4 which shows the lower stationary straight edges 12. This like the other straight edge 12 is provided along its upper inside edge with holes 24 corresponding to holes 25 in a removable template 26. This template 26 is provided with a location hole 27 which has been located from loft or engineering data. The brackets 16 are provided with location holes 28. The brackets 16 are moved so that the hole 28 therein coincides with the hole 27 in the template 26 ascertained by the insertion of a removable key pin 29 in such corresponding holes. When this is done the T-bolts 17 are tightened thereby holding the bracket in proper longitudinal position, the upper fittings or brackets 16 being similarly secured to the upper fixed straight edge 8 using a template as described. All the brackets securable to the slotted straight edges are preferably provided with a rib designated at 16' engageable in its associated slot to align the face of the bracket with the face of the straight edges.

Figure 5:
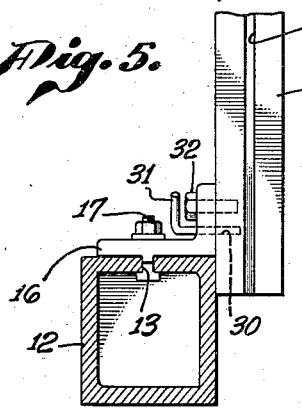
Fig. 5 is a view similar to Fig. 3 showing one of the vertical straight edges mounted thereon.
Figure 6:
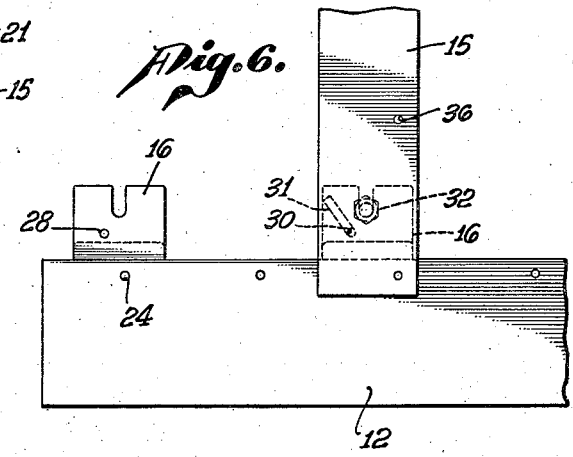
Fig. 6 is a face view of the parts shown in Fig. 5.

The manner in which the adjustable vertical straight edges 15 are secured to the fittings 16 is illustrated in Figs. 5 and 6 and consists of the following: The fittings 16 are each provided with a location hole 28 heretofore referred to and the vertical straight edges are provided with a corresponding hole 30. A removable pin 31 is inserted in the hole 28 and hole 30 and by this means it is known that the vertical straight edge 15 is in proper position. A bolt 32 is then tightened fixing the vertical straight edge of its respective fitting.

Figure 7:
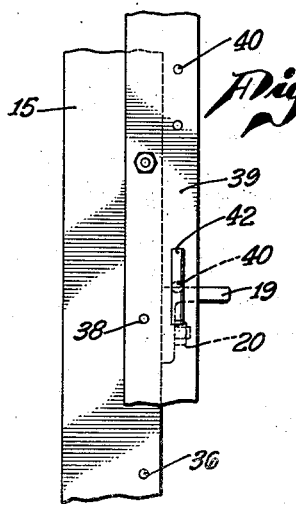
Fig. 7 is an elevation of one of the vertical straight edges illustrating the manner of mounting a fitting thereon.
Figure 8:
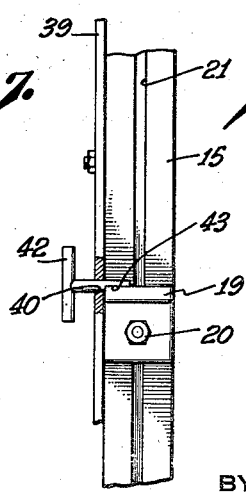
Fig. 8 is a face view of the parts shown in Fig. 7.

The manner in which the position of the cross straight edges 18 on the vertical straight edges 15 is determined as shown in Figs. 7 and 8. The vertical straight edges 15 are provided with holes 36 which correspond to holes 38 in a template 39. This template has a location hole or holes 40 which spot the dimension of water line measurement desired. The exact point of measurement is centrally of such hole in the template as it is at this point that the under face of the cross straight edge must coincide. Therefore, to locate the upper face of brackets 19 upon which the cross straight edge rests, a T-pin indicated at 42 is used. The end of this pin is half round as indicated at 43 and the pin being inserted in the selected hole 40 of the template the half round end of the pin extends over the face of the bracket 19 and the bracket secured to the vertical straight edge by the T-bolt 20 and the pin 42 removed. The cross straight edge is then placed upon the bracket as shown in Figs. 9 and 10 and secured thereto by tightening the T-bolt 45 in the slot 46 of the straight edge 18. The cross straight edge is also secured to the vertical straight edge 15 by means of a T-bolt 47 engageable in the slot 21 in the vertical straight edge 15.

By locating the vertical straight edges in the frame as above described the measurement on the fuselage reference line of the ship may be determined and by placing the horizontal or cross straight edges as above described the location of points with reference to the water line of the ship are determined. After this has been done points on the butt line may be located in the following manner; a template (see Fig. 11), indicated at 50, is used having a plurality of holes indicated at 51 which coincide with holes 52 in the cross straight edge 18. This template has a location hole or holes 53 which have been placed thereon from loft and engineering data. The template 50 is then bolted to the cross straight edge through the corresponding holes 51 and 52 in the template and straight edge respectively and T-pin 54 is inserted in the selected hole 53 in the template. This cross pin enters a hole in the end of a dummy fitting indicated at 55. When such dummy fitting is so located a T-bolt 56 engaging in the slot 46 is tightened thereby holding the dummy fitting in the proper position to be engaged by a jig fitting 57 on the jig structure indicated at 58, a part of the jig frame. The exact point to be located is designated by a hole 59 in the dummy fitting and the jig fitting is adjusted on the jig structure until the hole in the dummy fitting coincides with a similar hole in the jig fitting. When this location is made the jig fitting may be secured to the jig structure by welding or any other suitable manner, however, in Fig. 11 I have shown a preferred form of mounting the jig fitting on the jig frame. The jig fitting is provided with a threaded stud 60 which enters freely into an interiorly threaded hollow boss 61 welded to the frame 58. The boss 61 is provided with a hole 62 through which is poured a molten material, preferably a thermo setting alloy, filling the hollow boss about the threaded stud 60, being keyed in place by means of the threads on the stud and boss.

Figure 2:
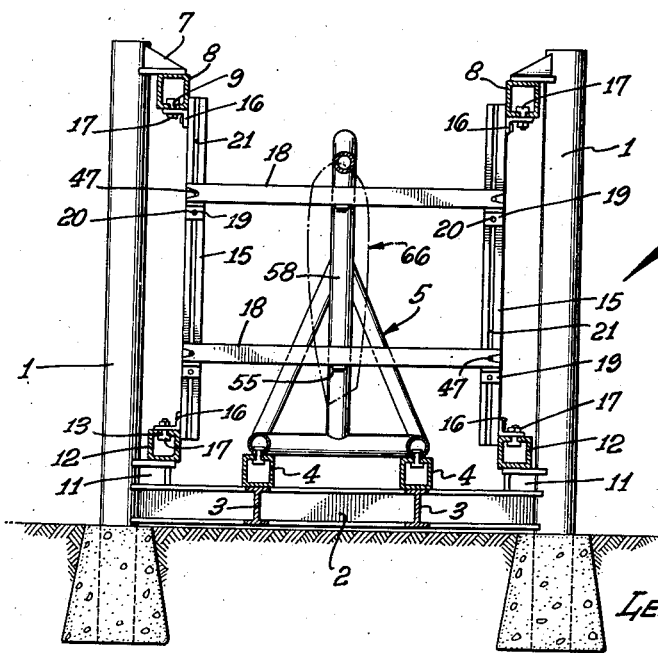
Fig. 2 is a cross sectional view on line 2—2 of Fig. 1.

As an illustration of the use of the apparatus above described I have shown in Figs. 1 and 2 a jig frame indicated at 5 which rests upon and is secured to the bars 4 of the frame structure. Shown in the jig frame is a phantom indicated at 66 in dot and dash which in the present form represents the inner end of a wing structure upon which is indicated at 67 the four points of fittings identical with those on the actual wing which indicates the brackets or other means by which the wing is to be attached to the fuselage frame. It will be readily understood from the foregoing description how such points are located by virtue of the correlation of the various straight edges and location from loft engineering data and the location of the dummy fittings on the cross straight edges.

In Fig. 13 I have illustrated diagrammatically how the three points in space are utilized for locating the attachment point on the jig. In this illustration the attachment point is the hole in the dummy jig fitting 55. The point on the station line is indicated by the dimension line "S" which gives the proper position of the vertical straight edge 15 on the horizontal straight edges 8 and 12. The dimension line "W" gives the vertical position or water line position of the under face of the cross straight edge 18 which serves to locate the dummy fitting 55 and the dimension line "B" gives the proper location on the butt line of the dummy fitting on the cross straight edge 18.

I claim as my invention:

1. In a jig making apparatus, a tooling frame comprising: a rigid structure, said rigid structure having a plurality of vertically extending posts; upper and lower horizontally disposed straight edges fixedly mounted on said posts, said straight edges being parallel to each other; vertically disposed adjustable straight edges mounted on said fixed straight edges; and a horizontally disposed straight edge adjustably mounted on said vertically disposed adjustable straight edges.

2. In a jig making apparatus, a tooling frame comprising a rigid structure, said rigid structure having a plurality of vertically extending posts; upper and lower horizontally disposed straight edges fixedly mounted on said posts, said straight edges being parallel to each other; a plurality of adjustable brackets on said fixed straight edges; vertically disposed straight edges secured to said brackets; a plurality of adjustable brackets on said vertical straight edges; and a horizontally disposed straight edge secured to said last named brackets.

3. In a jig making apparatus, a tooling frame comprising a rigid structure; upper and lower horizontally disposed straight edges fixedly mounted on said structure, said straight edges being parallel to each other; a plurality of adjustable brackets on said fixed straight edges; vertically disposed straight edges secured to said brackets; a plurality of adjustable brackets on said vertical straight edges; a horizontally disposed straight edge secured to said last named brackets; and fixed jig supporting members secured to said rigid supporting structure between said fixed straight edges.

4. In a device for fixing master locations on a jig, a supporting structure comprising: a horizontal member; a vertical member adjustably mounted on the horizontal member; a transverse member adjustably mounted on the vertical member; a location fitting mounted on said transverse member; and a plurality of strip templates mounted on said members for locating the relative position of said members and the position of the location fitting on said transverse member.

5. In a jig making apparatus, a tooling frame comprising: a rigid structure; horizontally disposed straight edges fixedly mounted on said structures, said straight edges being parallel to each other; vertically disposed adjustable straight edges mounted on said fixed straight edges; and a transverse horizontally disposed straight edge adjustably mounted on said vertically disposed adjustable straight edges, said straight edges having equally spaced holes therein; templates having spaced holes corresponding to the holes in the straight edges in one margin thereof and in the other margin holes spaced at distances peculiar to the dimensions of the product for which coordinated assembly fixtures are to be made and means engageable with the corresponding holes in the templates and straight edges for locating the templates in proper position on the straight edges.

6. In a jig making apparatus, a tooling frame comprising: a rigid structure; upper and lower horizontally disposed straight edges fixedly mounted on said structure, said straight edges being parallel to each other; vertically disposed adjustable straight edges mounted on said fixed straight edges; and a transverse horizontally disposed straight edge adjustably mounted on said vertically disposed adjustable straight edges, said straight edges having equally spaced holes therein; templates having spaced holes corresponding to the holes in the straight edges in one margin thereof and in the other margin, holes spaced at distances peculiar to the dimensions of the product for which coordinated assembly fixtures are to be made and means engageable with the corresponding holes in the templates and straight edges for locating the templates in proper position on the straight edges.

7. In a jig making structure, a tooling frame comprising: a rigid structure; said rigid structure having a plurality of vertically extending posts; four horizontally disposed straight edges fixedly mounted on said rigid structure; said straight edges being parallel to each other; vertically disposed adjustable straight edges mounted on said fixed straight edges and a horizontally disposed straight edge vertically, adjustably mounted on said vertically disposed straight edges and extending crosswise therebetween.

LELAND A. BRYANT.

REFERENCES CITED

The following references are of record in the file of this patent:

UNITED STATES PATENTS

| Number | Name | Date |
| --- | --- | --- |
| 666,655 | Eaton | Jan. 29, 1901 |
| 1,891,127 | Wallis | Dec. 13, 1932 |
| 1,956,480 | Wallis | Apr. 24, 1934 |
| 2,212,421 | Henderson | Aug. 20, 1940 |
| 2,255,184 | Osenberg | Sept. 9, 1941 |
| 2,328,040 | Weightman | Aug. 21, 1943 |
| 2,341,176 | Buehrig | Feb. 8, 1944 |

FOREIGN PATENTS

| Number | Country | Date |
| --- | --- | --- |
| 20,896 | Great Britain | 1912 |
| 457,372 | Germany | 1928 |